United States Patent
Kleveland (10) Patent No.: US 6,842,355 B2
(45) Date of Patent: Jan. 11, 2005

(54) HIGH OUTPUT POWER HIGH FREQUENCY RESONANT LOAD INVERTERS

(75) Inventor: Frode Kleveland, Stavanger (NO)

(73) Assignee: EFD Induction a.s., Skien (NO)

(*) Notice: Subject to any disclaimer, the term of this patent is extended or adjusted under 35 U.S.C. 154(b) by 34 days.

(21) Appl. No.: 10/381,415
(22) PCT Filed: Sep. 28, 2001
(86) PCT No.: PCT/NO01/00397
§ 371 (c)(1), (2), (4) Date: Mar. 25, 2003
(87) PCT Pub. No.: WO02/27908
PCT Pub. Date: Apr. 4, 2002

(65) Prior Publication Data
US 2003/0179595 A1 Sep. 25, 2003

(30) Foreign Application Priority Data
Sep. 29, 2000 (NO) .......................................... 20004938

(51) Int. Cl.$^7$ ........................ H02M 7/5387; H02M 3/24
(52) U.S. Cl. ........................................ 363/132; 363/97
(58) Field of Search ............................ 363/95, 97, 98, 363/131, 132; 219/660–665

(56) References Cited

U.S. PATENT DOCUMENTS

| 5,486,994 A | | 1/1996 | Pouliquen et al. |
| 5,710,698 A | * | 1/1998 | Lai et al. ................. 363/56.05 |
| 5,774,351 A | * | 6/1998 | Hsieh et al. ................ 363/132 |
| 5,968,398 A | | 10/1999 | Schmitt et al. |
| 6,078,033 A | | 6/2000 | Bowers et al. |
| 6,483,723 B2 | * | 11/2002 | Kuranuki et al. ............. 363/17 |

FOREIGN PATENT DOCUMENTS

GB 2 298 747 9/1996

* cited by examiner

Primary Examiner—Matthew V. Nguyen
(74) Attorney, Agent, or Firm—Young & Thompson

(57) ABSTRACT

A new control strategy for IGBTs when used in high frequency (75 kHz–500 kHz) high power (10 kW–5 MW) inverters with series resonant load, a topology commonly used for induction heating. The strategy changes the IGBT strain elements into a total stress picture that fits the IGBP's behaviour and internal nature better. This makes the IGBT operate much more efficient, thus increasing the maximum output power from the inverter significantly compared to a standard control scheme. This makes the IGBT based inverter a much cheaper alternative than a MOSFET inverter, which has been state of the art for this application.

13 Claims, 8 Drawing Sheets

HIGH OUTPUT POWER HIGH FREQUENCY RESONANT LOAD INVERTERS

BACKGROUND OF THE INVENTION

The present invention relates to a high power, high frequency resonant load inverter system for providing increased output power.

DESCRIPTION OF THE RELATED ART

The use of MOSFETs is not straightforward in such applications, due to the voltage level required (approximately 700 V at the DC link). Its internal diode can not be used as a free wheeling diode because a current through this diode sets up the conditions for possible turn-on of the parasitic BJT. The steep voltage rise across the reverse conducting MOSFET, caused by the complementary MOSFET turn-on, leads to destructive failure in this case. Unwanted MOSFET turn-on can be avoided by carefully monitoring the converter, but the only completely reliable solution is a diode in series with the MOSFET drain and an external free wheeling diode. This latter approach is expensive.

IGBT's do not have an internal diode. This is because the junction providing for conductivity modulation of the collector drift region functions Was a series diode. As a result a good external free wheeling diode can be chosen without the need of any series diode. The IGBT is a widely used device, and is produced in large numbers. It is a cheap component compared to the MOSFET said voltage level and power range of 10 kW–5 MW. This difference in cost between MOSFET's and IGBT's becomes even larger if the series diode is needed for the MOSFET application. The IGBT-solution could be more attractive than a MOSFET-solution even if severe derating is necessary for the IGBTs due to the high switching frequency in the range 75 kHz–500 kHz. It was basically cost arguments that was the motivation to develop an IGBT based solution.

It is also a fact that parameter spreading between MOSFET chips is much larger than among e.g. NPT IGBT chips, which make the IGBT chips easier to connect in parallel. Current sharing during turn-off is a problem in large MOSFET inverter with massive parallel connection.

The classic problem with IGBTs at these high frequency is the severe derating which has to be performed. The present invention therefore aims at providing a new control principle to cause such derating to be substantially less severe, which turns the IGBT solution highly competitive concerning both cost and size.

SUMMARY OF THE INVENTION

Thus, according to the invention there has been developed a new control strategy for IGBTs when used in high frequency (75 kHz–500 kHz) high power (10 kW–5 MW) inverters with series resonant load, a topology commonly used for induction heating. The strategy changes the IGBT strain elements into a total stress picture that fits the IGBT's behaviour and internal nature better. This makes the IGBT operate much more efficient, thus increasing the maximum output power from the inverter significantly compared to a standard control scheme. This makes the IGBT based inverter a much cheaper alternative than a MOSFET inverter, which has been state of the art for this application. Also, the invention provides for a more effective way of destressing IGBTs to make them capable of handling the losses at this high frequency.

Acoording to the invention, the system comprises an inverter device which is subdivided into sections, each section comprising two sets of current switches, each set having two IGBT (Insulated Gate Bipolar Transistor) switch means connected in series, each set having an output at a midpoint between said means for feeding a respective input terminal on a power load having an LC resonant compensation, and a main driver circuit for controlling each IGBT switch means of each set.

According to a feature of the system a power transformer is connected between said outputs and said input terminals.

Suitably, the inverter device operates with a reduced switching frequency which is lower than an LC resonant frequency by providing driver signals from said main driver unit to one section at a time, thus causing the switching frequency to become 1/n of said resonant frequency, n being the number of sections.

Said LC resonant compensation is suitably an LC series resonant compensation, and said sections have in such a case a DC voltage power supply. Alternatively, said LC resonant compensation is an LC parallel resonant compensation, said sections in such a case having a DC current power supply.

In a further embodiment, the inverter device operates with a reduced switching frequency which is lower than an LC resonant frequency by providing driver signals from said main driver unit to all sections simultaneously to cause all sections to deliver current output during only one cycle of the switching frequency, thus causing all sections to deliver current output at a rate 1/n of said resonant frequency, n being the number of sections. In such a case, the current output from all sections are added to cause oscillations in said LC series resonant compensated output load and thereby a continuous sinusoid output current, power being supplied to said LC series resonant compensated load at said rate and thereby providing a pulse-shaped output voltage at a rate of 1/n.

Suitably, the inverter device provides an operation frequency in the range of 75 kHz–500 kHz, and an output power in the range of 10 kW–5 MW.

The system as defined and to be further described in the description below and defined in the claims is suitable e.g. for operating an inductive load in an induction heating or a contact welding operation device.

It should be noted that by the term "switch means" in the context of the IGBT's, it is contemplated that said switch means could be a single IGBT as shown as a non-limiting example on the drawings or at least two IGBT's in parallel.

BRIEF DESCRIPTION OF THE DRAWINGS

The invention is now to be described further with reference to the attached drawings, showing non-limiting examples of the inventive system.

DESCRIPTION OF THE PREFERRED EMBODIMENTS

To understand the new control strategy, the loss picture in the IGBT for this application has to be investigated. At this high frequency, the turnoff losses are totally dominant, and very large. At normal current levels, the device will be destroyed through overheating very rapidly, so a destressing has to be performed. A simple current level reduction will make the inverter reliable, but the current level becomes very low. As such, the device does not seem to be well suited.

Figure 1A:
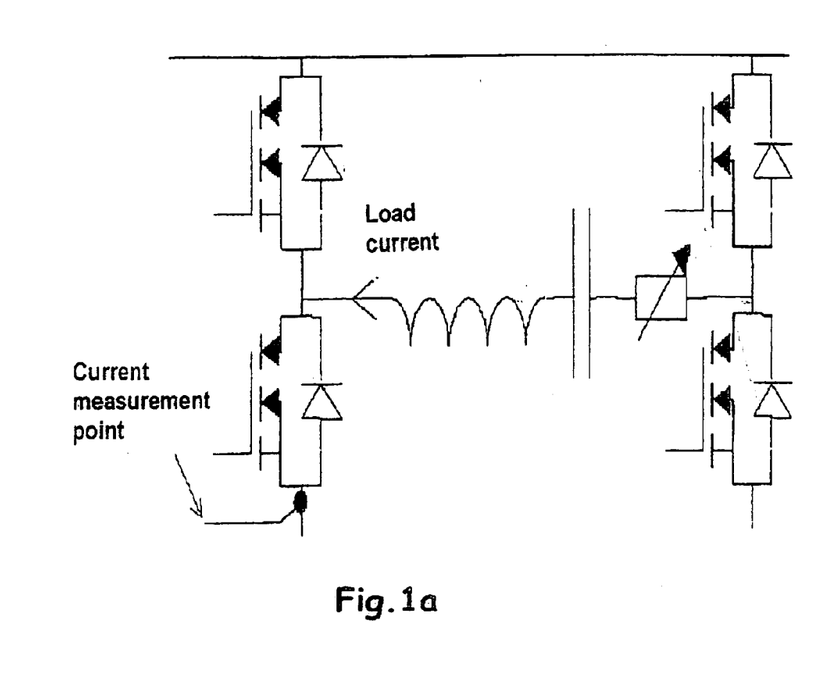
FIG. 1a illustrates a test circuit topology of an inverter and FIG. 1b illustrates a waveform related thereto.
Figure 1B:
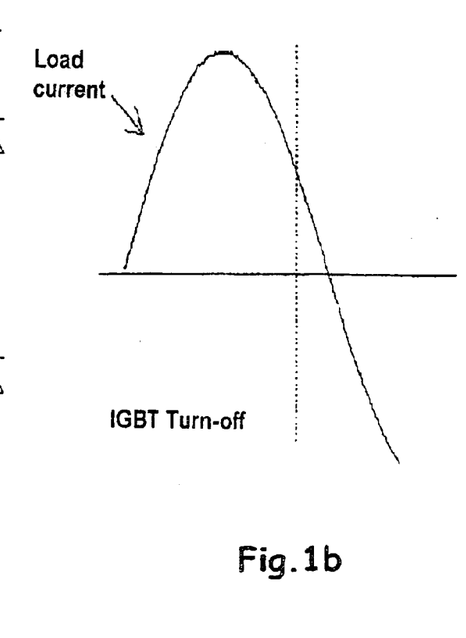
Figure 2A:
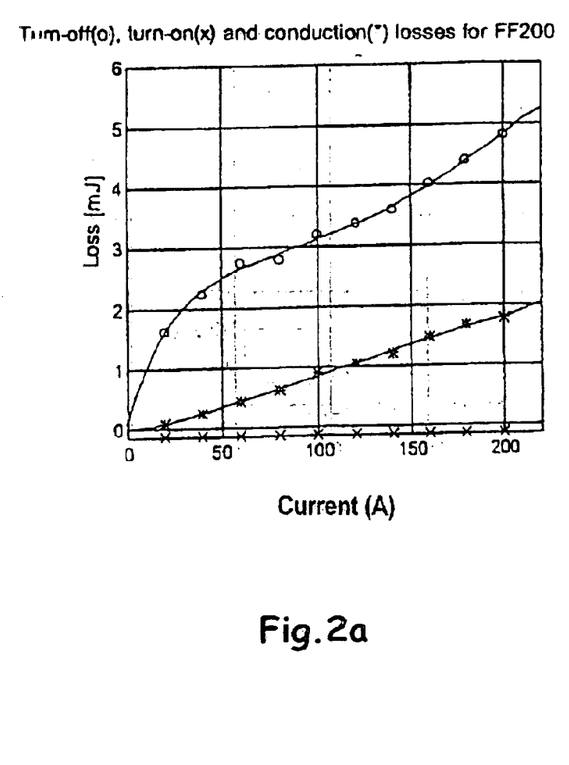
FIG. 2a illustrates turn-off, turn-on and conduction loss measurements for an IGBT of type Eupec FF200R12KS4 (referred to as FF200)
Figure 2B:
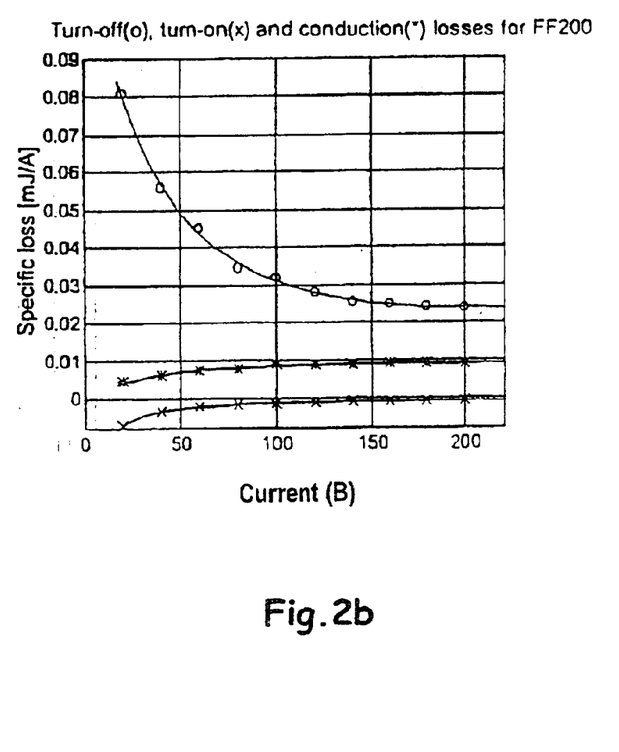
FIG. 2b shows the specific losses [mJ/A]. Current is peak current during on state. Conduction loss is conduction energy loss pr cycle at 300 kHz.

Thus, it is necessary to pay regard to the IGBT's nature. Turn-off loss measurements show that the losses do not vary linearly with the current, as shown in FIG. 2. At low current levels, the turn off loss to current ratio is larger compared to at higher current levels. This indicates that simply lowering the IGBT current level is a poor way of performing a destressing. The turn-off efficiency will be very poor compared to what is achievable at higher current levels. The new control strategy secures an effective high current turn-off, but still gives the desired IGBT loss level. This is done by letting the output current rotate between different sections A–D in the inverter, see FIGS. 3a, 3b and 4.

Figure 3A:
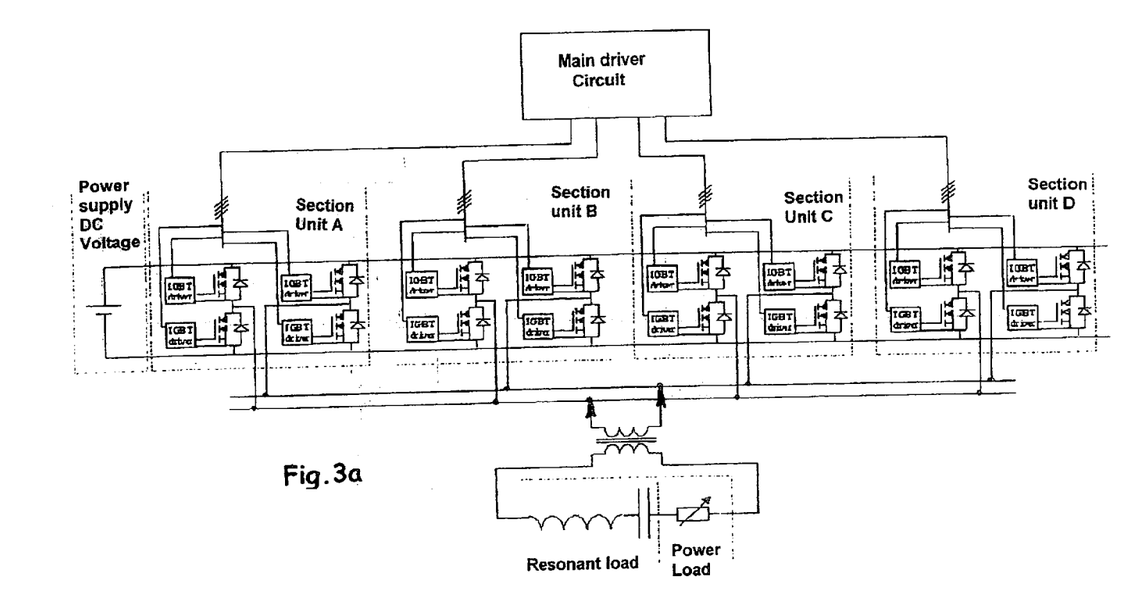
FIGS. 3a and 3b illustrate the electrical connections in a series compensated inverter shared into sections where the derating is performed by lowering the effective switching frequency rather than lowering the current density.
Figure 3B:
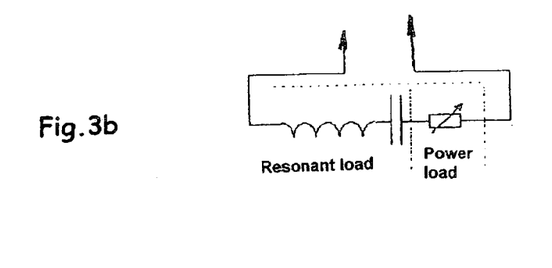
Figure 4:
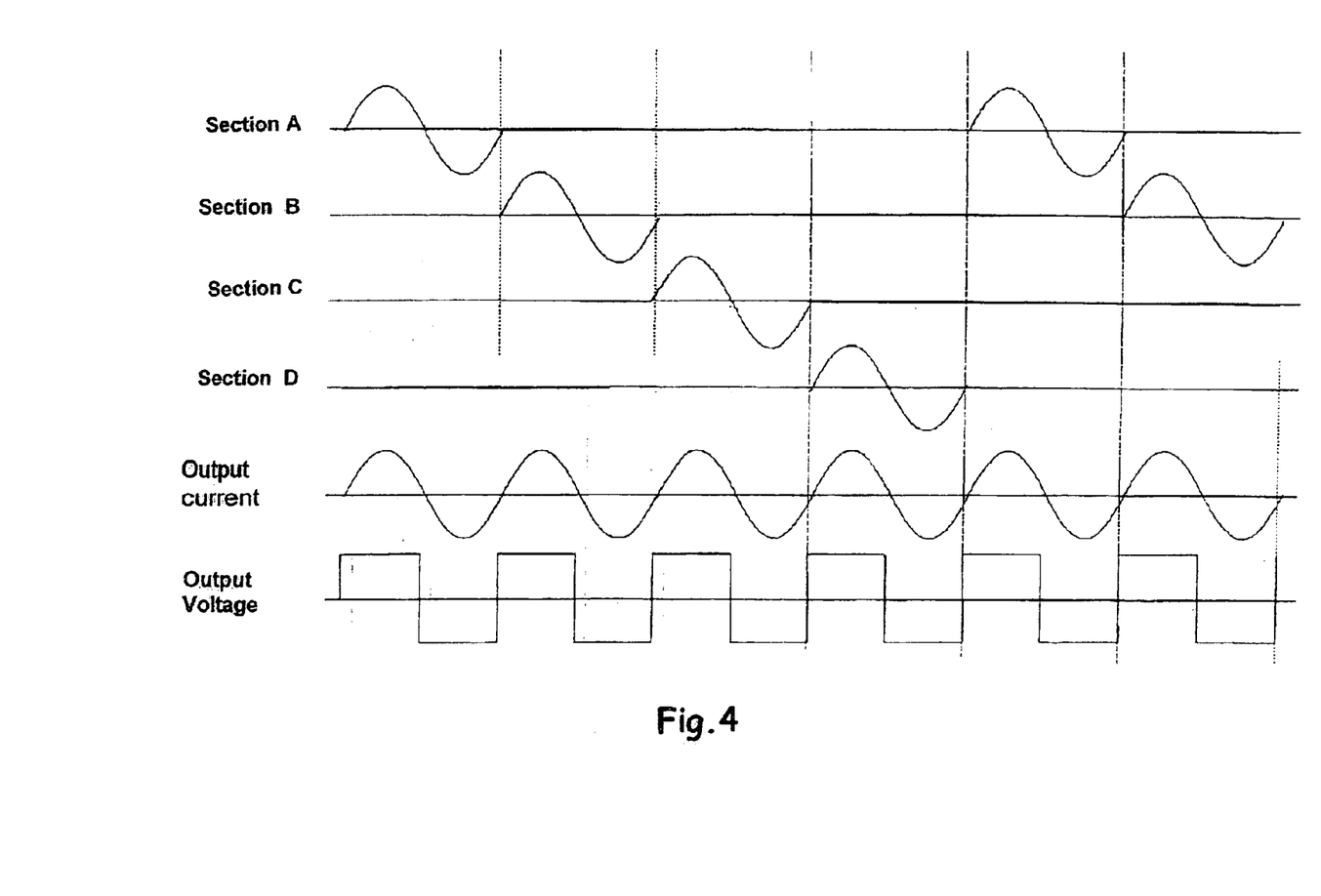
FIG. 4 illustrates current and voltage waveforms in a series compensated inverter shared into sections where derating is performed by lowering the effective switching frequency rather than lowering the current density.

The sequence control method shown on FIGS. 3 and 4 is related to a series compensated inverter. FIG. 3 shows the electrical connections. It should be observed that FIG. 3a shows an embodiment having a transformer between section outputs and the series compensated load. However, it is possible to dispense with the transformer, as indicated by FIG. 3b. FIG. 4 shows the current and voltage waveforms. The electrical connections themselves introduce necessarily nothing new, a traditional inverter can very well have the same wiring. The difference occurs in the main driver circuit, where the inverter is shared into sections which are not switched simultaneously, but follow the pattern shown on FIG. 4.

Figure 5A:
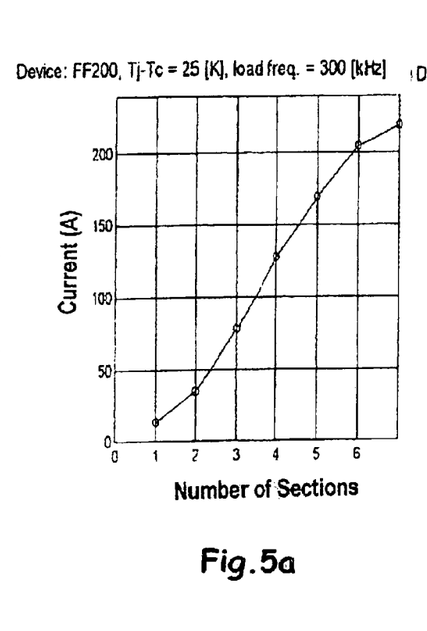
FIGS. 5a, 5b and 5c illustrate data for IGBT of type Eupec FF200; i.e. IGBT current level, output power per H bridge and power loss per IGBT for different number of current sections, respectively.
Figure 5B:
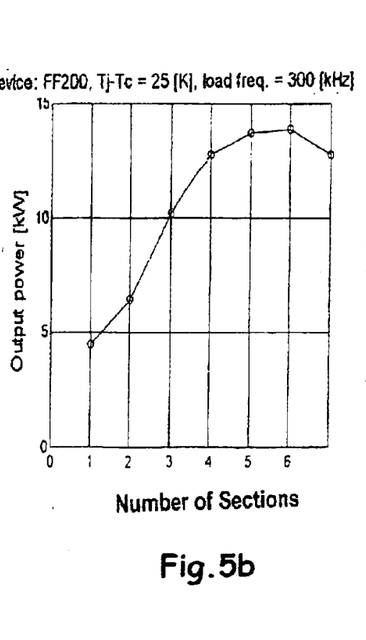
Figure 5C:
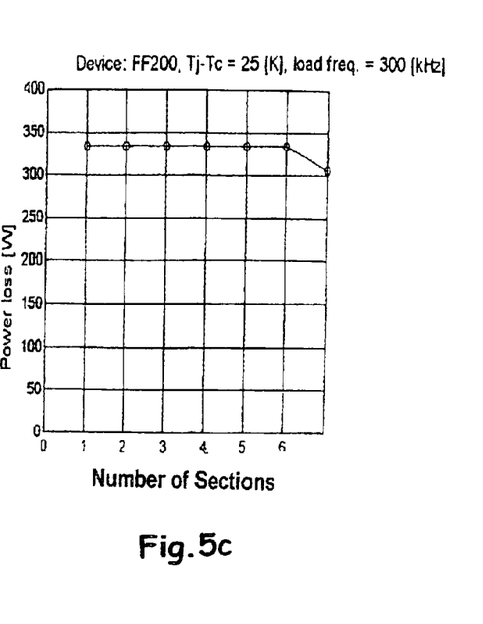

Through this switching pattern, a destressing by reduced switching frequency rather than by current reduction is achieved. FIG. 4 shows how the switching frequency of the IGBTs is lower than the resonant frequency. One section conducts the entire output current, but is relieved with currentless periods. The number of currentless periods equals the number of sections minus 1. With four sections as shown on FIG. 3 and represented on FIG. 4, the sections A–D have three currentless periods. The reduced switching stress allows the IGBTs to operate at much higher current levels than if the IGBTs were switched each period, like in a standard parallel operation with equal current sharing in every cycle. The high current operation of the IGBT secures the most effective turn off, or more precisely, the minimum turn off loss to current ratio. This increases the effectiveness of the transistors, and the output power for a given IGBT loss level increases. FIG. 5 shows the enhanced maximum power output for different section numbers. This graph is based on the measurements shown in FIG. 2.

The device suitably makes use of a new generation of NPT (Non-Punch-Through) IGBT devices from Infinion Technologies, which is designed for higher switching speed. However, an inverter utilizing PT (Punch-Through) IGBT's will exhibit a comparable output power increase by introducing the novel control strategy.

A traditional inverter would be an inverter with one section only, and with all the IGBTs parallelled in this section. When using more than one section, parallel connection of several IGBTs within each section is a way to achieve the desired output power. Another possibility is a modular system where each module is a complete system as shown on FIG. 3.

An effect that is not yet discussed is that the passive IGBTs will act as a capacitive snubber and relieve the IGBTs turning off, and will therefore be a further advantage during inductive switching. This effect is not included in FIG. 5. However, during capacitive switching, when IGBT turn on determines the voltage rise, a capacitive snubber enhances the losses, and is a disadvantage. However, capacitive switching only occurs during very steep load transients, like in the beginning of a load short circuit transient.

Figure 6A:
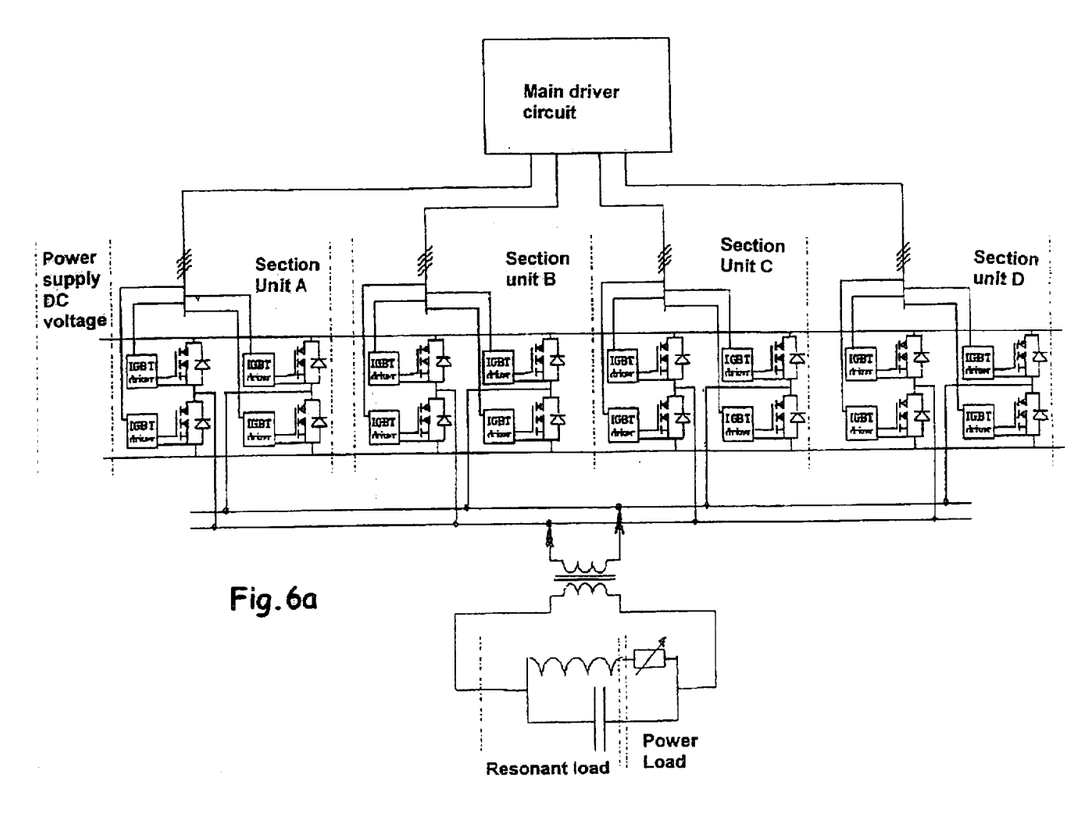
FIGS. 6a and 6b are examples of a parallel compensated inverter shared into sections where the derating is performed by lowering the effective switching frequency rather than lowering the current density.
Figure 6B:
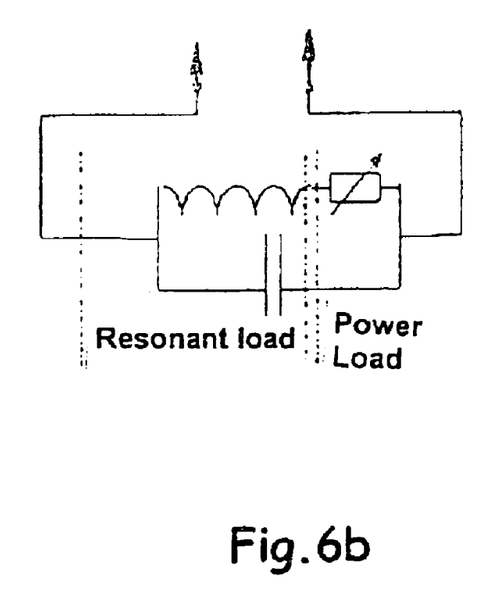
Figure 7:
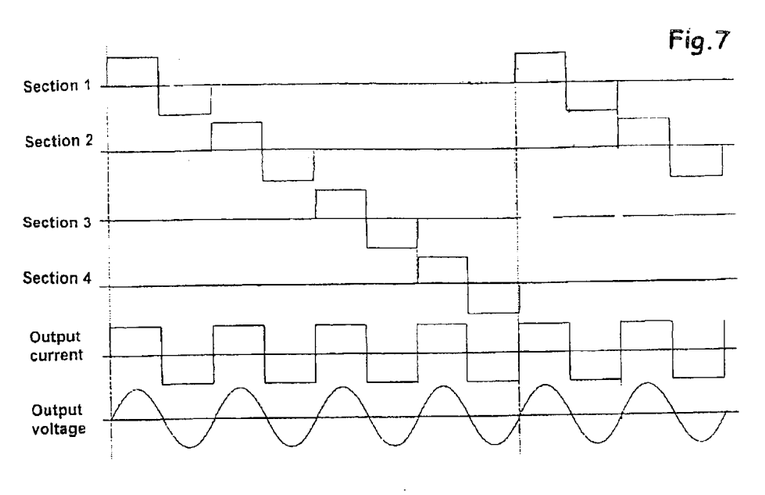
FIG. 7 shows the current and voltage waveforms using four sections.

All the figures up till now describe a series compensated inverter. However, this control strategy can also be used on a parallel compensated inverter, which is current fed. This is shown on FIG. 6. As shown on FIG. 7, the current blocks will be rectangular and the output voltage sinusoidal, but the principle is equal, and the benefit comparable. It should be observed that FIG. 6a shows an embodiment having a transformer between section outputs and the parallel compensated load. However, it is possible to dispense with the transformer, as indicated by FIG. 6b.

Figure 8:
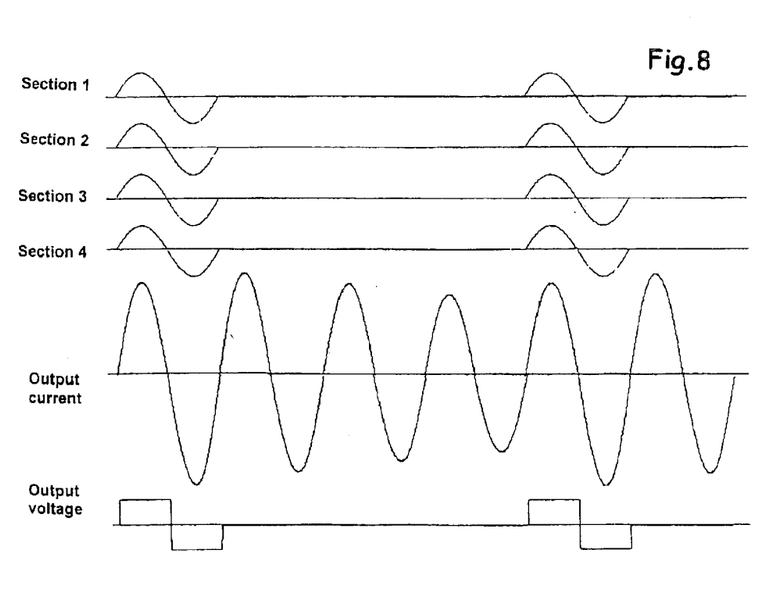
FIG. 8 relates to a further embodiment of a series compensated inverter shared into sections where the derating is performed by lowering the effective switching frequency rather than lowering the current density.

An interesting side-effect of this principle is the possibility to achieve a very effective load impedance matching by using different timing between the sections, as shown in FIG. 8. This is possible for a series compensated inverter. Load impedance matching is a crucial point in induction heating.

In FIG. 4, each section carries current every fourth period. The inverter switches each period, and the inverter output current rotates between the four sections. FIG. 8 presents another way of arranging the switching pattern. Here, all four sections conducts current in the same period, and the inverter output only switches every fourth period. Between the switchings, the load current will oscillate, and power to the load is supplied by the stored energy in the oscillating LC circuit. (The load is symbolized by the variable resistor in FIG. 4.) During this time interval, the load current will decrease, as indicated in FIG. 8. When the inverter output switches, the DC link delivers power to the load and in addition enhances the stored energy in the oscillating LC circuit. The LC circuit thereby effectively acts as an energy storage means.

In FIG. 4, the output voltage is defined being equal to 1 and the output current equal to 1. Hence, a power equal to 1 is delivered to a load impedance equal to 1. In FIG. 8, where all four sections carry current in the same period, the output voltage then equals ¼ and the output current equals 4. Hence, a power equal to 1 is delivered to a load impedance which then is $1/16$. Dependent on the number of sections used, different switching patterns are possible. With four sections, three patterns are possible, two of them being described here. The third possibility is letting two sections carry current at a time, serving an impedance equal to ¼.

What is worth to notice, is that the switching loss according FIGS. 4 and 8 will be the same, since the sections carry the same current. The difference occurs during the passive periods. In the case of FIG. 4, the output will switch, but the IGBT will carry no current. In FIG. 8, the output will not switch, and the IGBT will be constantly on or off. The current will circulate in either the lower or the upper IGBTs. This will cause extra conduction losses in the control scheme of FIG. 8, leading to somewhat larger overall losses in this case compared to the case of FIG. 4. To bring the losses down to the desired level while using the switching pattern in FIG. 8, the current, and hence the maximum output power, has to be somewhat lower.

The conclusion is that in the cases of FIGS. 4 and 8 with four sections A–D, the same inverter is able to deliver (nearly) the same power into load impedances which differ by a factor of 16. In a section shared inverter, a wide range of load impedances can be served, while the inverter delivers close to rated output power. This is a great advantage compared to other control principles or strategies, where the current in semiconductor devices has to increase proportional to the load impedance fall in order to deliver constant output power. The consequence of this effect is severe in a MOSFET inverter, where losses caused by $R_{DS,on}$ are dominating.

With reference to FIG. 8, it will be noted that the timing between sections is different compared to that shown in FIG. 4, which makes the inverter deliver the same power, with only slightly higher losses, to a much smaller load impedance of ¹⁄₁₆.

When the IGBTs switch more seldom, the driving power decreases. Driving power is surprisingly large with heavy parallel connection at these frequencies, and a decrease to ¼ using four sections A–D is a convenient property. Another positive property is that current sharing between parallelled modules and chips cause less problems in a section shared inverter. The main reason for this is that the current level and thereby conduction voltage drop will increase, which will stabilize the current sharing. In addition, fewer chips will share the current, and they will be closer located. This comes in addition to the use of IGBT chips (NPT-type), which are not so exposed to parameter spreading as MOSFET chips.

Thus, the present invention provides a new control strategy for IGBTs used in high frequency applications where a destressing of the IGBTs has to be performed in order to handle the switching losses. The strategy results inter alia in the following benefits: reduced IGBT losses; fewer IGBT chips sharing the load current; effective impedance matching property; replacing expensive custom designed MOSFET modules by standard IGBT modules; an possibilty of utilizing similar technology for both high and low frequency applications.

The inventive implementation of the present new control strategy will lead to a significant improvement of products in the high power high frequency product range. The invention also greatly outweighs the following drawbacks: increased drive circuit complexity; slightly lower efficiency compared to MOSFET inverters; using standard IGBT modules implies more free wheeling diodes than necessary for the present applications, the extra free wheeling diodes being a drawback during capacitive switching.

What is claimed is:

1. High power, high frequency resonant load inverter system for providing increased output power, the system comprising:

an inverter device which is subdivided into parallel sections, each section comprising two sets of current switches, each set having two IGBT (Insulated Gate Bipolar Transistor) switch means connected in series, each set having an output at a midpoint between said means for feeding a respective input terminal on a power load having an LC resonant compensation, and a main driver circuit for controlling each IGBT switch means of each set, said inverter device operating with a reduced switching frequency which is lower than a LC resonant frequency by providing driver signals from said main driver unit to one section at a time, thus causing the switching frequency of each section to become 1/n of said resonant frequency, n being the number of sections.

2. The system according to claim 1, wherein a power transformer is connected between said outputs and said input terminals.

3. The system as claimed in claim 1, wherein said LC resonant compensation is an LC series resonant compensation, and wherein said sections have a DC voltage power supply.

4. The system as claimed in claim 1, wherein said LC resonant compensation is an LC parallel resonant compensation, and wherein said sections have a DC current power supply.

5. The system according to claim 3, wherein the system delivers a continuous sinusoid output current and a continuous rectangular output voltage.

6. The system according to claim 4, wherein the system delivers a continuous rectangular output current and a continuous sinuoid output voltage.

7. The system according to claim 5, wherein said output current and said output voltage are at least substantially in-phase.

8. The system according to claim 1, wherein the inverter device provides an operation frequency in the range of 75 kHz–500 kHz.

9. The system according to claim 1, wherein the inverter device provides an output power in the range of 10 kW–5 MW.

10. The system according to claim 1, wherein the system is used for operating an inductive load in an induction heating or contact welding operation device.

11. The system as claimed in claim 2, wherein said LC resonant compensation is an LC series resonant compensation, and wherein said sections have a DC voltage power supply.

12. The system as claimed in claim 2, wherein said LC resonant compensation is an LC parallel resonant compensation, and wherein said sections have a DC current power supply.

13. The system according to claim 6, wherein said output current and said output voltage are at least substantially in-phase.

* * * * *